United States Patent [19]

Magnuson

[11] Patent Number: 5,256,212
[45] Date of Patent: Oct. 26, 1993

[54] METHOD AND APPARATUS FOR FLAME CUTTING A WORKPIECE

[75] Inventor: James M. Magnuson, Kankakee, Ill.

[73] Assignee: Peddinghaus Corporation, Bradley, Ill.

[21] Appl. No.: 859,111

[22] Filed: Mar. 27, 1992

[51] Int. Cl.$^5$ .............................................. B23K 7/10
[52] U.S. Cl. ...................................... 148/194; 266/77
[58] Field of Search ........................... 266/48, 67, 77; 148/194

[56] References Cited

U.S. PATENT DOCUMENTS

| | | | |
|---|---|---|---|
| 3,127,661 | 4/1964 | McConnell | 266/48 |
| 3,190,628 | 6/1965 | Litzka | 266/67 |
| 3,713,637 | 1/1973 | Cable | 266/67 |
| 3,826,478 | 7/1974 | Paine | 266/48 |
| 4,205,828 | 6/1980 | Hooper | 266/77 |
| 4,317,560 | 3/1982 | Troyer | 266/48 |
| 4,662,612 | 5/1987 | Magnuson | 266/48 |
| 4,715,774 | 12/1987 | Magnuson | 414/751 |

OTHER PUBLICATIONS

Brochure: "Peddinghaus ABC-1000/4 and ABC-M-1000/4 CNC Structural Burning Systems" Jan. 1991.

Primary Examiner—Scott Kastler
Attorney, Agent, or Firm—Dressler, Goldsmith, Shore, Sutker & Milnamow, Ltd.

[57] ABSTRACT

A method and apparatus are provided for cutting an elongate workpiece. A conveyor is provided for supporting the workpiece lengthwise along an X-axis in a mutually orthogonal X, Y, and Z-axis coordinate system. An X-axis positioner is provided for moving the workpiece along the X-axis on the support conveyor. A torch is mounted on a guide ring with the flame in an orientation to impinge upon the workpiece along the cutting path. The torch revolves on, or with, the guide ring at least partially around the workpiece to position the torch in a selected orientation. The guide ring is also movable along the Z-axis and along the Y-axis by means of linear positioning tables.

19 Claims, 6 Drawing Sheets

METHOD AND APPARATUS FOR FLAME CUTTING A WORKPIECE

TECHNICAL FIELD

This invention relates generally to a method and apparatus for cutting a workpiece, including structural steel members and the like. The invention is particularly suitable for use in shaping the ends of, and cutting openings in, structural angles and structural channels

BACKGROUND OF THE INVENTION AND TECHNICAL PROBLEMS POSED BY THE PRIOR ART

When structural beams are erected in buildings and other structures, some of the beams must typically be provided with slots, holes, or particular end configurations for accommodating connections to other beams. Additionally, some beams may have to be provided with clearance holes or regions to accommodate other components, such as piping that may be routed adjacent or through a beam flange or web.

When a structural angle beam or channel beam is used for bracing in a structure, such a beam may have to be oriented at an oblique angle relative to two main structural beams. The angle beam or channel beam is typically connected at its ends to the main structural beams. However, owing to the oblique angle orientation of the angle beam or channel beam, an end of the flange of the angle beam or channel beam may interfere with a web or flange of the main beam and prevent a proper connection from being made. Accordingly, the end of such an angle beam or channel beam is typically cut at an angle, or arcuately, to permit the desired fit for establishing a proper connection.

In some conventional procedures, large shearing machines are employed for shearing structural beams, such as angle beams and channel beams, to provide angled ends on the beams. The beam is typically oriented at an angle to the shear member in the shearing machine. However, maintaining the proper angle of the beam in the shearing machine can be difficult, and this process is not easily controlled.

In other shearing machines, special dies can be employed to accommodate the shearing of the end of the beam by the shearing member at an angle. However, an inventory of special dies must be produced and maintained. The appropriate die must then be selected and installed in the shearing machine, and this can increase labor and operation costs.

When it is desired to provide elongate clearance apertures in webs or flanges of beams, conventional practices involve the use of milling machines or hand-held, flame cutting torches. This can be labor intensive, time-consuming, and costly.

It would be desirable to provide an improved system for shaping the ends of structural beams and for providing clearance openings in structural beams.

It would be especially advantageous to provide such a system which could be employed in a relatively small space, on, or in conjunction with, an existing structural beam fabrication line that includes conventional punch presses and/or other machines for processing structural beams as they are moved along a conveying system.

Preferably, such an improved beam shaping system should employ a torch for flame cutting in a manner that can be automatically controlled without undue complexity.

Further, it would be beneficial if such an improved system could be provided with a very compact arrangement that would reduce the space required for the system and its operation.

The present invention provides an improved method and apparatus for shaping beams which can accommodate designs having the above-discussed benefits and features.

SUMMARY OF THE INVENTION

An improved system is provided for shaping the ends of workpieces, such as structural beams, and for making openings in the workpieces. The system employs a flame cutting torch and is especially suitable for use on existing structural beam fabrication lines wherein a structural beam is moved along a conveyer. The system is especially effective for cutting an angled end configuration in a structural channel beam or angle beam as the channel or angle beam is conveyed along a beam fabrication line.

In one aspect of the present invention, a method is provided for cutting an elongate workpiece, such as a beam, along a predetermined cutting path with a flame from a cutting torch.

The workpiece is supported in a mutually orthogonal X, Y, and Z-axis coordinate system so that the workpiece is oriented lengthwise along the X-axis. A torch is mounted adjacent the workpiece and is positioned with the flame in a first orientation to impinge upon the workpiece at a first location along the cutting path.

While maintaining the impingement of the flame on the workpiece, the torch is moved with the flame in the first orientation so as to include a component of motion along at least one of the Y and Z axes and to move the flame to a second location along the cutting path for cutting the workpiece between the first and second locations.

While continuing to maintain impingement of the flame on the workpiece, the torch is swung in a circular arc, such as on a circular arc guide, to move the flame to a second orientation by pivoting the flame about the arc central axis which passes through the second location and which is parallel to the X-axis.

While still maintaining the impingement of the flame on the workpiece, the torch is moved with the flame in the second orientation so as to include a component of motion along at least one of the Y and Z axes and to move the flame to a third location along the cutting path for cutting the workpiece between the second and third locations.

In a preferred form of the method of the present invention, the workpiece is conveyed along the X-axis during the movement of the torch flame along the Y-axis and/or Z-axis so as to define at least a portion of the cut along an oblique angle relative to the X-axis or along a curved path.

According to another aspect of the invention, an apparatus is provided for carrying out the steps of the above-described cutting method. The apparatus includes a support means for supporting the workpiece oriented lengthwise along the X-axis in the mutually orthogonal X, Y, and Z-axis coordinate system.

A torch mounting means is provided for mounting the torch with the flame in an orientation to impinge upon the workpiece on the cutting path. The torch mounting means includes an arcuate positioning means for supporting and moving the torch in a circular arc locus relative to a central axis parallel to the X-axis. In a preferred form of the invention, the arcuate positioning means includes a circular guide ring. In one embodiment the torch is moved around the ring. In another embodiment, the ring, with the torch fixed thereon, revolves around the workpiece.

The torch mounting means also includes a Z-axis linear positioning means for supporting and moving the arcuate positioning means, such as the guide ring, along the Z-axis. Finally, a Y-axis linear positioning means is provided in a location fixed relative to the support means, and the Y-axis linear positioning means supports and moves the Z-axis linear positioning means along the Y-axis.

In a preferred embodiment, an X-axis positioning means is provided for moving the workpiece along the X-axis on the support means. This permits a cut to be made along a path that is not perpendicular to the X-axis, such as along an oblique angle relative to the X-axis. Thus, the apparatus can be efficiently employed to cut flanged beams wherein the ends of the flanges are angled relative to the beam length.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

The present invention provides a novel method and apparatus for use with a torch for flame cutting a workpiece. The invention can be embodied in an efficient system for providing openings in structural beams and/or for shaping the ends of structural beams while such beams are conveyed on a beam fabrication line.

The system can cut the desired shape in a beam with just one torch, and the system can be accommodated on the beam fabrication line in a relatively small space.

In the preferred form of operation, the system efficiently cuts the beam by maintaining the flame in contact with the beam at all times during the cutting process as the beam and/or torch are moved. For common structural beam shapes, the system can be operated with relatively simple controls by effecting relative movement in only two axes simultaneously so as to provide an angled cut.

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, used, and sold in an orientation other than the position described.

Some of the figures illustrating an embodiment of the apparatus show structural details and mechanical elements that will be recognized by one skilled in the art. However, the detailed descriptions of such elements are not necessary to an understanding of the invention, and accordingly, are not herein presented.

The apparatus of this invention is used with certain conventional components the details of which, although not fully illustrated or described, will be apparent to those having skill in the art and an understanding of the necessary functions of such components.

A first embodiment of the apparatus of the present invention is illustrated in FIGS. 1-6 wherein the apparatus is designated therein generally by the reference numeral 10. The apparatus 10 is schematically illustrated as part of a workpiece processing system, such as a structural beam fabrication line which may include a plurality of machines (not illustrated), such as a shearing machine, punch press, cutting machine, drilling machine, or the like. Such machines may be located generally along a processing line or pass line for operating on a workpiece seriatim or simultaneously.

A workpiece 14, in the form of a structural channel beam, is shown positioned within the apparatus 10 for accommodating operations effected by the apparatus 10. The beam 14 has a web 16 and a pair of upwardly projecting, spaced-apart, parallel webs 18.

The workpiece channel beam 14 is disposed on a support system, which may function as a conveying system and which includes a series of pairs of rollers 20 and 21 spaced-apart along the length of the beam. The rollers 21 are longer than the rollers 20 in the embodiment illustrated in FIGS. 1-6.

Figure 2:
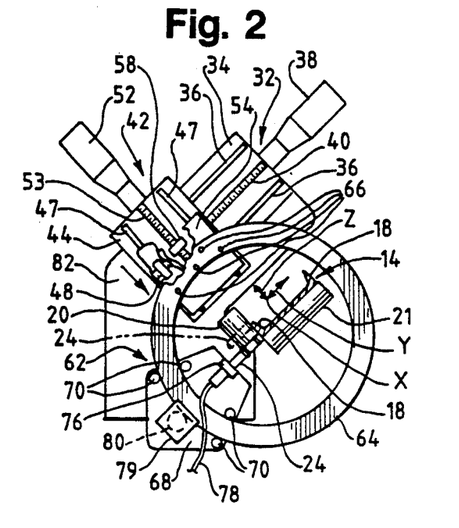
FIGS. 2-6 are simplified views taken generally along the plane 2—2 in FIG. 1 and showing the sequence of operation of the apparatus with some of the structural details omitted for ease of illustration.

As illustrated in FIG. 2, the rollers 20 and 21 of each pair of rollers are mounted for rotation about two mutually orthogonal axes and are oriented to define a generally upwardly open, V-shaped cradle for the workpiece beam 14. The beam web 16 is positioned against the rollers 21 forming one leg of the V-shaped cradle, and the web 16 is thus generally parallel to the axes of rotation of the rollers 21.

The support system for the workpiece 14 may be characterized as functioning to provide support for the workpiece in a mutually orthogonal, three-axis coordinate system represented in FIG. 2 by an X-axis, Y-axis, and Z-axis. The X-axis defines a line of movement of the workpiece 14 along the support system rollers 20 and 21, and the movement may be in either of the two opposite directions along the X-axis. The X-axis may be considered to be the workpiece pass line or parallel to it. The Z-axis and Y-axis may be characterized as lying in a common plane perpendicular to the X-axis. The beam web 16 is parallel to the Y-axis, and the beam flanges 18 are generally parallel to the Z-axis.

It will be appreciated that the representation of the X, Y, and Z-axes in FIG. 2, and the references thereto in this specification and in the claims, are provided with the understanding that the axes represent directions of motion of the components or workpiece, and not a specific line of action or path of movement of the components. Thus, although the actual movement path of a component may be parallel to, but spaced from, an axis as located in FIG. 2, such movement is characterized in this specification and in the claims as "along the axis."

Figure 1:
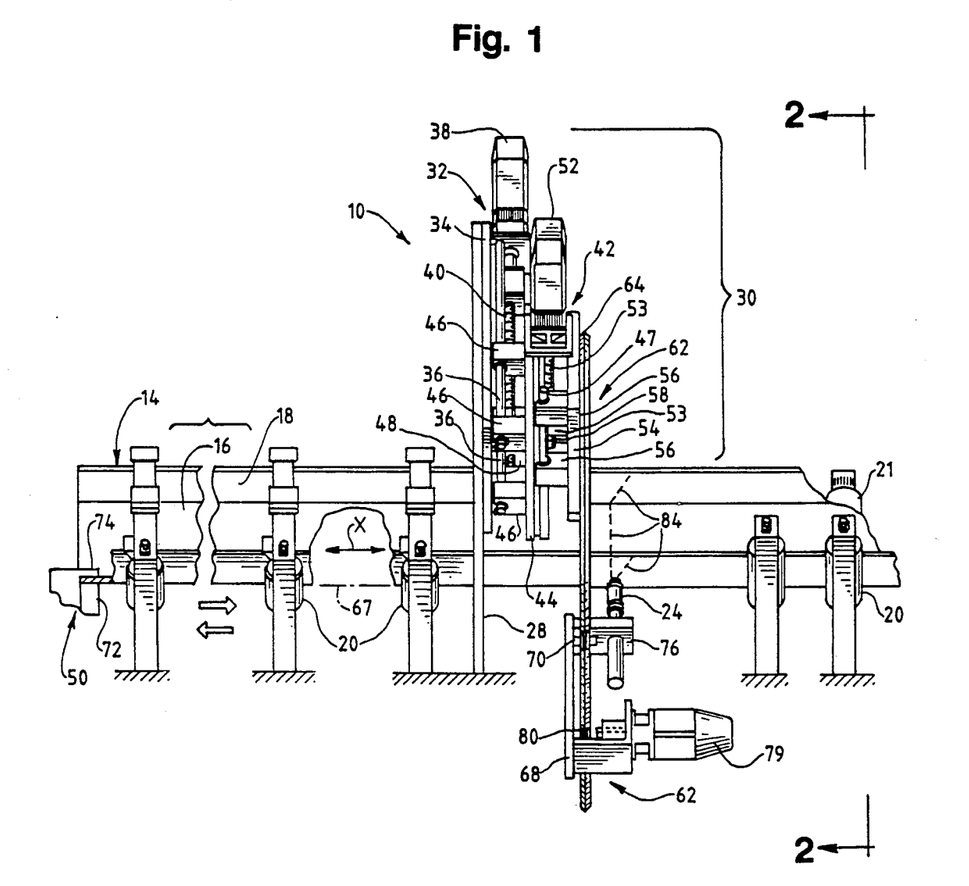
FIG. 1 is a simplified, fragmentary, side elevational view of a structural beam flame cutting apparatus embodying the principles of a first embodiment of the present invention.

As illustrated in FIG. 1, the apparatus 10, includes, or is adapted to cooperate with, an X-axis positioning means 50 for positioning or moving the workpiece 14 along the X-axis. The positioning means 50, in the embodiment illustrated, includes a gripping assembly for gripping the trailing end of the workpiece 14 and moving the workpiece along the conveying path. Such a positioning means or gripping assembly 50 is described in detail in the U.S. Pat. No. 4,715,774 wherein a gripping assembly is described with reference to element 50 in the figures of that patent. The description of the gripping assembly 50 as disclosed in the U.S. Pat. No. 4,715,774 is incorporated herein by reference to the extent pertinent and to the extent not inconsistent therewith.

In this description, only such portions of the gripping assembly 50 as are relevant to a presently preferred embodiment of the invention have been illustrated in detail, those portions being described only in sufficient detail hereinbelow so as to afford an understanding of their relation to other components of the apparatus 10.

Briefly, the gripping assembly 50 includes a lower jaw 72 and a movable upper jaw 74. When the assembly 50 is used for gripping and moving a channel beam oriented on the V-shaped cradle rollers 20 and 21, the lower jaw 72 preferably includes an upwardly open, V-shaped notch for receiving the bottom corner of the channel beam 14. The upper jaw 74 may have a V-shaped, or round, lower surface for engaging the channel beam 14 and gripping it tightly against the lower jaw 72.

The clamping assembly 50, when tightly clamping the channel beam 14, can be moved along the axis of the conveyor rollers 20 and 21 (to the right or left as viewed in FIG. 1) so as to move the angle beam 14 along the apparatus 10. The mechanisms for effecting the clamping operation of the jaws 72 and 74 and for moving the jaws to push the angle beam 14 past the apparatus 10 are illustrated and described in detail in the above-identified U.S. Pat. No. 4,715,774.

It will be appreciated that positioning means other than the gripping assembly 50 may be employed to effect the movement of the channel beam 14 along the X-axis. Indeed, in some applications, it may be necessary to move the beam 14 first in one direction along the X-axis, and subsequently along the X-axis in the opposite direction. Although not explicitly described in the U.S. Pat. No. 4,715,774, the gripping assembly 50 can be designed and operated to selectively push the beam in one direction along the X-axis and pull the beam back in the opposite direction along the X-axis.

Further, where such reciprocating movement along the X-axis is desired, other types X-axis positioning means could be employed. For example, drive rollers, similar to support rollers 20 and 21, could be provided with suitable drive means to rotate as necessary for effecting movement of the beam in either direction along the X-axis. The detailed design and specific structure of such an X-axis positioning means 50 form no part of the present invention.

The conveyor system defined by the rollers 20 and 21 may be characterized as a support means for supporting the workpiece 14. Other support means, including other types of conveyor systems, could be employed. In the first embodiment illustrated in FIGS. 1-6, the conveyor system or support means is constructed to provide a clearance region around at least a major portion of the periphery of the transverse cross section of the workpiece 14 to accommodate a flame cutting torch 24 which can be moved at least part way around the workpiece 14 as explained in detail hereinafter.

The cutting torch 24 is carried on a torch mounting means 30. The torch mounting means 30 includes a number of positioning mechanisms described in detail hereinafter. A bottom portion of the torch mounting means 30 is supported at a fixed location relative to the conveyor system rollers 20 and 21. The torch mounting means 30 is arranged to locate the torch 24 for movement at least part way around the periphery of the workpiece 14 in a clearance region between adjacent pairs of rollers 20 and 21.

The torch 24 may be of any suitable conventional or special design, such as a dual gas plasma cutting torch. Such a torch produces a flame or plasma for cutting through the workpiece. In this specification and in the appended claims the high temperature discharge from the torch for cutting the workpiece is generally referred to as a "flame." One suitable torch that may be employed with the invention is the torch designated with the tradename MAX200 and sold in the United States of America by Hypertherm, Inc., which has an office at Etna Road, Hanover, N.H. 03755 U.S.A. The detailed design and operation of the torch per se form no part of the present invention.

The torch mounting means 30 includes a suitable support frame 28 which is mounted to the conveyor system frame and/or is supported from the floor adjacent the conveyor system at a fixed location. A Y-axis linear positioning means 32 is mounted to the support frame 28 and includes a base 34 having a pair of spaced-apart, parallel, guide rods 36. A drive means, such as an electrically-operated, servo-drive motor 38, is mounted to the base 34 and has a threaded, drive screw 40 projecting between, and parallel to, the two guide rods 36.

The Y-axis linear positioning means 32 supports and positions a Z-axis linear positioning means 42. The Z-axis linear positioning means 42 includes a base 44 having pairs of guide bearings or sleeves 46 slidably mounted on the guide rods 36 of the Y-axis linear positioning means 32 to accommodate reciprocation of the Z-axis positioning means 32 along the Y-axis. The Z-axis linear positioning means 42 includes an internally threaded, driven sleeve 48 which is threadingly engaged with the drive screw 40 of the Y-axis linear positioning means servo-drive motor 38 to effect reciprocation of the Z-axis linear positioning means base 44 along the Y-axis.

The Z-axis linear positioning means 42 includes a pair of spaced-apart, parallel guide rods 47 mounted to the base 44. Also mounted to the base 44 is a Z-axis, electrically-operated, servo-drive motor 52 from which a drive screw 53 extends between, and parallel to, the guide rods 47.

A table 54 is mounted for movement along the Z-axis on the base 44. To this end, the table 54 includes pairs of spaced-apart guide bearings or guide sleeves 56 which are slidably received on the guide rods 47 to accommodate reciprocation of the table 54 along the rods 47. An internally threaded drive sleeve 58 is mounted to the table 54 and is threadingly engaged with the threaded drive screw 53 of the servo-drive motor 52 of the Z-axis linear positioning means 42. The servo-drive motor 52 can be operated to effect movement of the table 54 in either direction along the Z-axis.

The Z-axis linear positioning means 42 carries an arcuate positioning means 62 which includes a circular guide ring 64. The guide ring 64 is mounted to the table 54 by suitable means, such as screws 66 (FIG. 2), so that it moves with the table 54. The circular guide ring 64 is oriented generally in a plane normal to the X-axis. The circular guide ring 64 defines a circular arc locus relative to the ring central axis 67 (FIG. 1). The ring central axis 67 passes through the point in the torch flame which contacts the surface of a workpiece during a cutting operation. The central axis 67 moves with the ring 64. In the preferred embodiment, the ring 64 is oriented so that its central axis 67 is parallel to the fixed coordinate system X-axis. In some operations for cutting some beams, the guide ring central axis 67 may be momentarily coincident with the X-axis as the Y-axis and Z-axis positioning means are operated.

The arcuate positioning means 62 further includes a movable carriage 68 which is supported on the guide ring 64. To this end, the carriage 68 includes four, spaced-apart rollers 70. Each roller 70 is mounted to the carriage 68 for rotation about an axis parallel to the X-axis (which, in the preferred embodiment, is parallel to the guide ring central axis 67). The outer and inner edges of the guide ring 64 preferably have a V-shaped configuration, and each roller 70 has a V-shaped groove for receiving the guide ring 64 and retaining it in the vertically oriented position on the carriage 68.

The torch 24 is secured in a bracket or clamp 76 mounted on the carriage 68, and the torch gas supply lines 78 extend from the rear end of the torch 24 to the supply and control system (not illustrated).

The arcuate positioning means 62 also includes a rotary drive means in the form of an electrically-operated, servo-drive motor 79. The motor 79 is mounted on the carriage 68 and has a rotary drive roller 80 (FIG. 2) engaged with the periphery of the circular guide ring 64. The rotary drive motor roller 80 preferably has a V-shaped annular groove for effectively engaging the exterior edge of the circular guide ring 64. Rotation of the motor 79 in one direction or the other will drive the carriage 68 clockwise or counterclockwise about the ring 64.

In some applications, it may be desirable to accommodate a complete, 360° revolution of the carriage 68 on the guide ring 64. In such a situation, the carriage 68 may be mounted to the front side of the guide ring instead of the rear side as shown in FIG. 1. The carriage rollers 70 would have to be mounted on the rear side of the carriage 68 instead of the front side as shown in FIGS. 1 and 2, and the shaft of the motor 79 would have to extend through the carriage 68 so that the motor drive wheel could be engaged with the guide ring 64 on the side of the carriage 68 opposite from that illustrated in FIG. 1. Further, the screws 66 mounting the guide rings 64 to the table 54 could be replaced with longer screws and spacers for spacing the guide ring 64 off of, and outwardly of, the table 54.

The apparatus 10 can be conveniently operated to make a variety of cuts in the workpiece channel beam 14. For example, the apparatus 10 can be operated to provide an angled cut along a cutting path represented by dotted lines 84 in FIG. 1. Initially, the apparatus 10 can be arranged in a position in which the torch 24 is at the top edge of the lower flange 18, and this initial position is indicated for the torch 24 in dashed lines in FIG. 2. This initial position would be established, with respect to the position of the torch 24 illustrated in solid lines in FIG. 2, by operating the Z-axis positioning means 42 to move the guide ring 64, and hence the torch 24, along the Z-axis to position the torch 24 at the location indicated by dashed lines in FIG. 2.

After the torch 24 has been located in the initial position as indicated by dashed lines in FIG. 2, the torch is operated to begin cutting. The torch flame will extend generally in a plane normal to the X-axis, and the flame will impinge upon the top edge of the web 18. The orientation of the torch flame at this initial position may be characterized as a "first orientation", and the flame may be characterized as impinging upon the workpiece at a "first location" on the cutting path 84.

The Z-axis positioning means 42 is then operated to move the ring along the Z-axis (in the direction of the arrow 82 in FIG. 2) to move the torch 24 down the flange 18 toward the bottom web 16. As the torch 24 moves along the Z-axis, the workpiece channel beam 14 is also moved along the X-axis (toward the right as viewed in FIG. 1) by the X-axis positioning means or gripping assembly 50. The torch cutting flame will thus follow the locus of the cutting path 84 to cut the flange 18 at an angle relative to the X-axis. The slope of the angle 84 is determined, of course, by the relative rates of movement of the workpiece channel beam 14 in the X-axis direction and of the torch 24 in the Z-axis direction.

When the torch 24 has reached the bottom of the flange 18 as illustrated in solid lines in FIG. 2, the torch may be characterized as having been moved to a second location along the cutting path for cutting the workpiece between the first and second locations.

Figure 3:
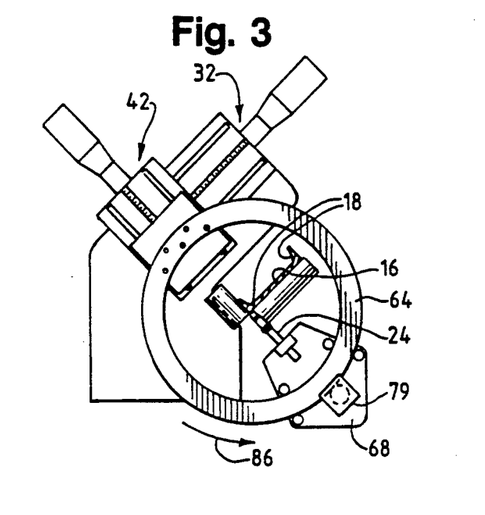

At this point, the movement of the workpiece channel beam 14 in the X-axis direction may be temporarily terminated. The rotary motor 79 is operated to cause the carriage 68 to travel along a 90° arc of the guide ring 64. This causes the torch 24 to be swung in a circular arc (as illustrated in FIG. 3 by the arcuate arrow 86) to move the flame to a second orientation. During this operational step, the flame pivots about the central axis 67 which passes through the second location and which is parallel to the X-axis.

Figure 4:
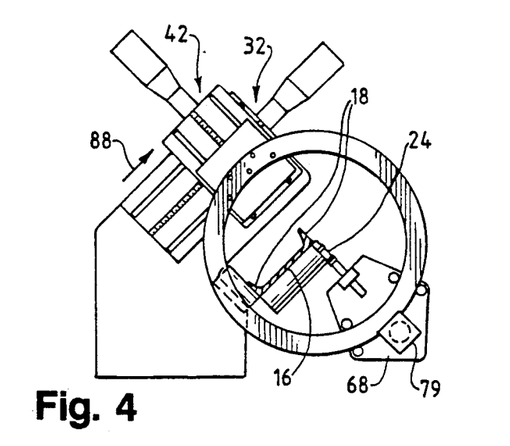

Next, the straight, transverse portion of the cut 84 is made across the channel beam web 16 as illustrated in FIG. 4. This is effected by operating the Y-axis linear position means 32 to move the torch 24 along the Z-axis (as indicated by the arrow 88 in FIG. 4). During the transverse movement of the torch 24 across the bottom of the web 16, the movement of the channel beam 14 along the X-axis (by the gripping assembly 50) is terminated.

Figure 5:
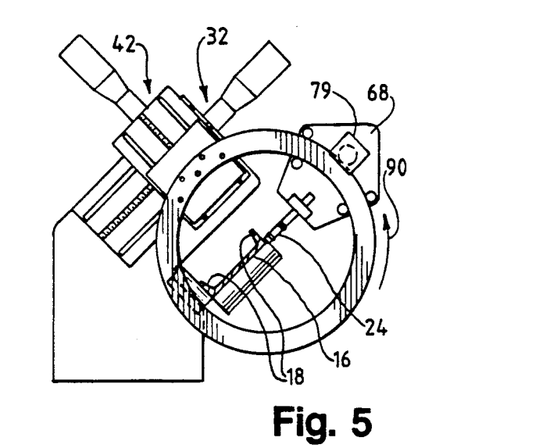
Figure 6:
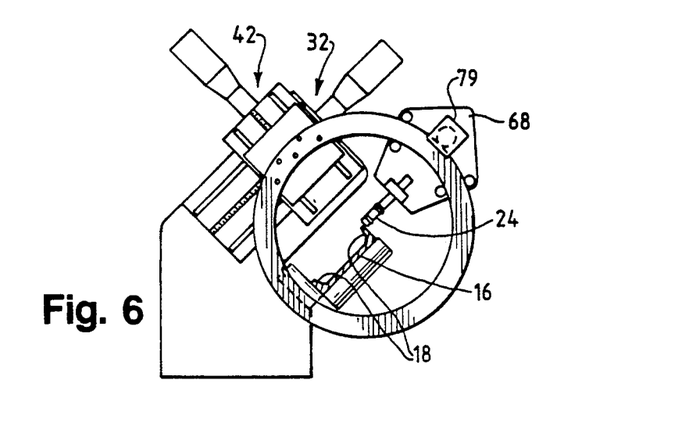

Next, the torch 24 is moved to a third orientation as illustrated in FIG. 5. This is effected by operating the rotary motor 79 to drive the carriage 68 along another 90° arc on the guide ring 64 as indicated generally by the arrow 90 in FIG. 5. During this operation, the flame pivots about the central axis 67 of the guide ring 64, and the impingement of the flame on the workpiece channel beam 14 is maintained. Finally, the last portion of the cut 84 can be made in the upper web 18 of the channel beam 14. In order to provide an angled cut in registry with the first angled cut on the opposite flange 18, the channel beam 14 is moved along the X-axis by the gripping assembly 50 in the opposite direction (toward the left as viewed in FIG. 1) while the Z-axis linear positioning means 42 is operated to move the guide ring along the Z-axis to carry the torch 24 to the top edge of the flange 18. In FIG. 6, the linear movement of the torch 24 along the Z-axis (as effected by the Z-axis linear positioning means 42) is designated generally by the arrow 92.

Another embodiment of the present invention is illustrated in FIGS. 7-10. The second embodiment of the apparatus is designated generally by the reference numeral 110 in FIG. 7. The apparatus 110 includes a number of mechanisms that are similar, and which function in a similar manner, to the elements of the first embodiment of the apparatus 10 described above with reference to FIGS. 1-6. The similar or functionally analogous elements in the second embodiment are designated by reference numbers in the 100 series in which the last two digits are identical to the two digits used for the corresponding elements in the first embodiment illustrated in FIGS. 1-6.

Figure 7:
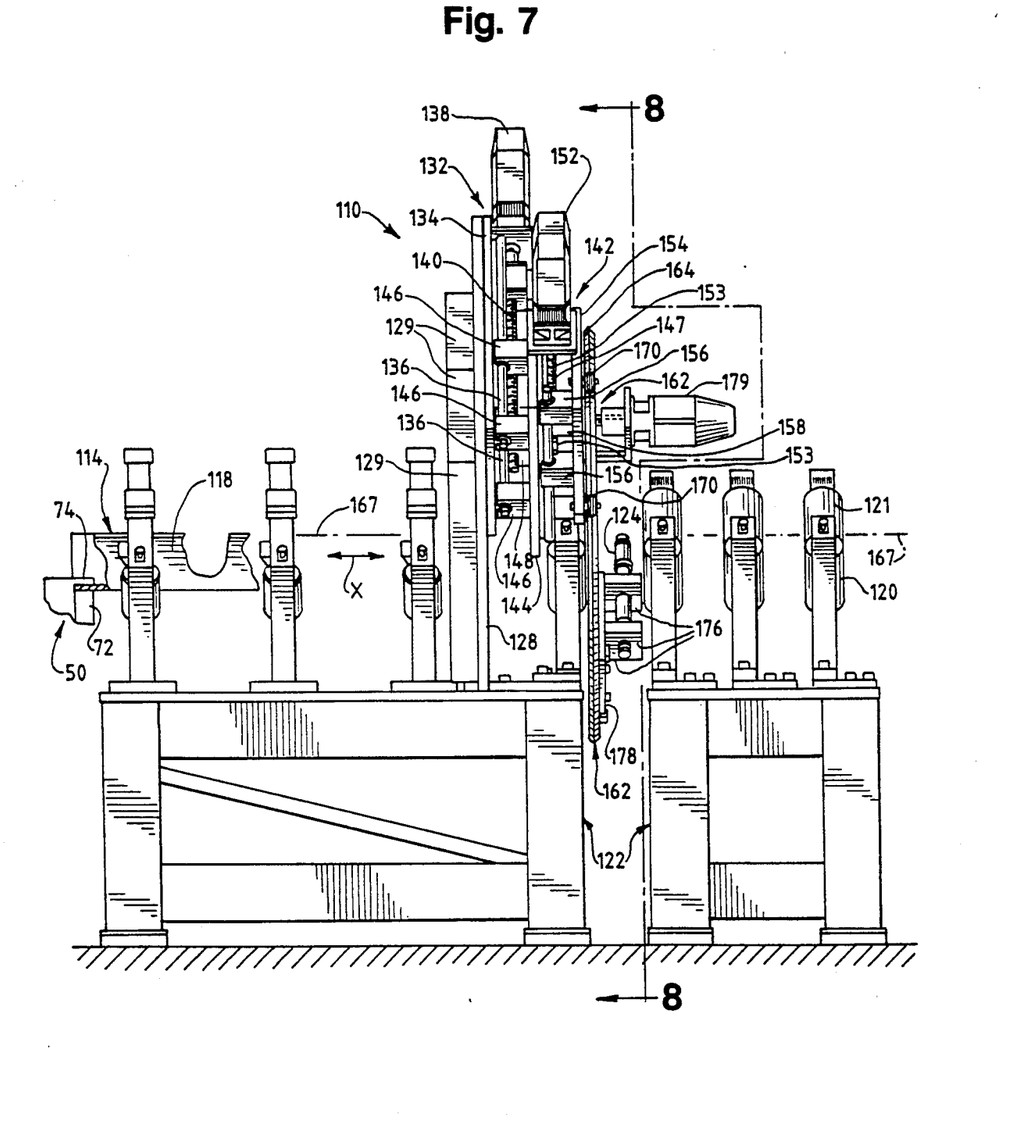
FIG. 7 is a simplified, side elevational view of a second embodiment of the apparatus of the present invention shown in association with a conveying system which can accommodate other beam-shaping apparatus (not illustrated)

FIG. 7 illustrates a beam fabrication line for processing structural beams. Various conventional or special types of beams may be processed. A conventional angle beam 114 is illustrated in FIG. 7.

The angle beam 114 includes a pair of flanges 118 which are disposed at right angles to each other. The angle beam 114 is disposed lengthwise along a support system or conveying system that includes a plurality of pairs of rollers wherein each pair of rollers includes a short roller 120 and a longer roller 121. In each roller pair, the short roller 120 is oriented about a rotational axis generally perpendicular to the rotational axis of the long roller 121. The rollers are oriented to define a generally upwardly open, V-shaped cradle for receiving the workpiece or angle beam 114 with on of the flanges 118 supported by the short rollers 120 and with the other of the flanges 118 supported by the long rollers 121.

Figure 8:
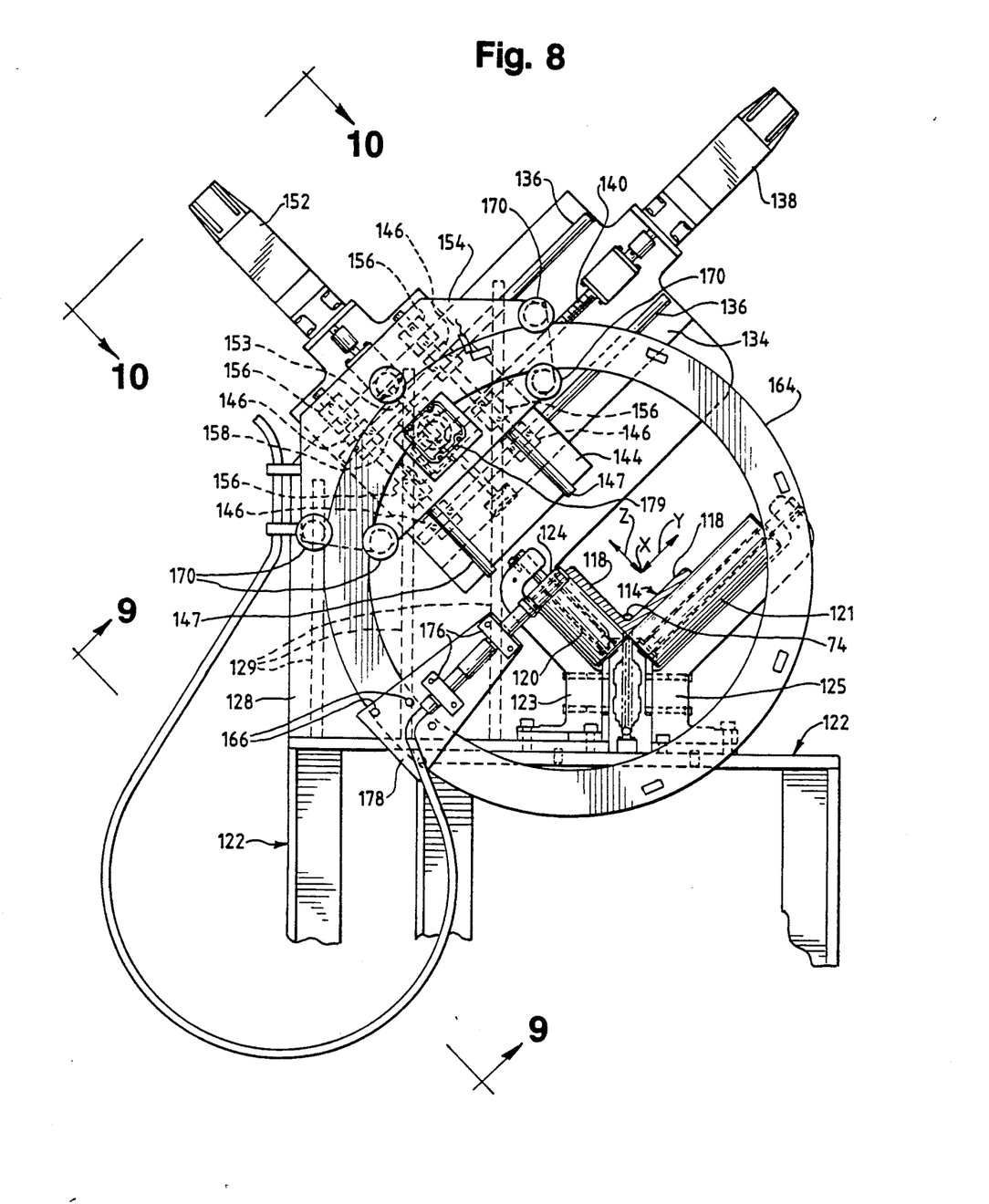
FIG. 8 is a view of the apparatus taken generally along the planes 8—8 in FIG. 7.
Figure 9:
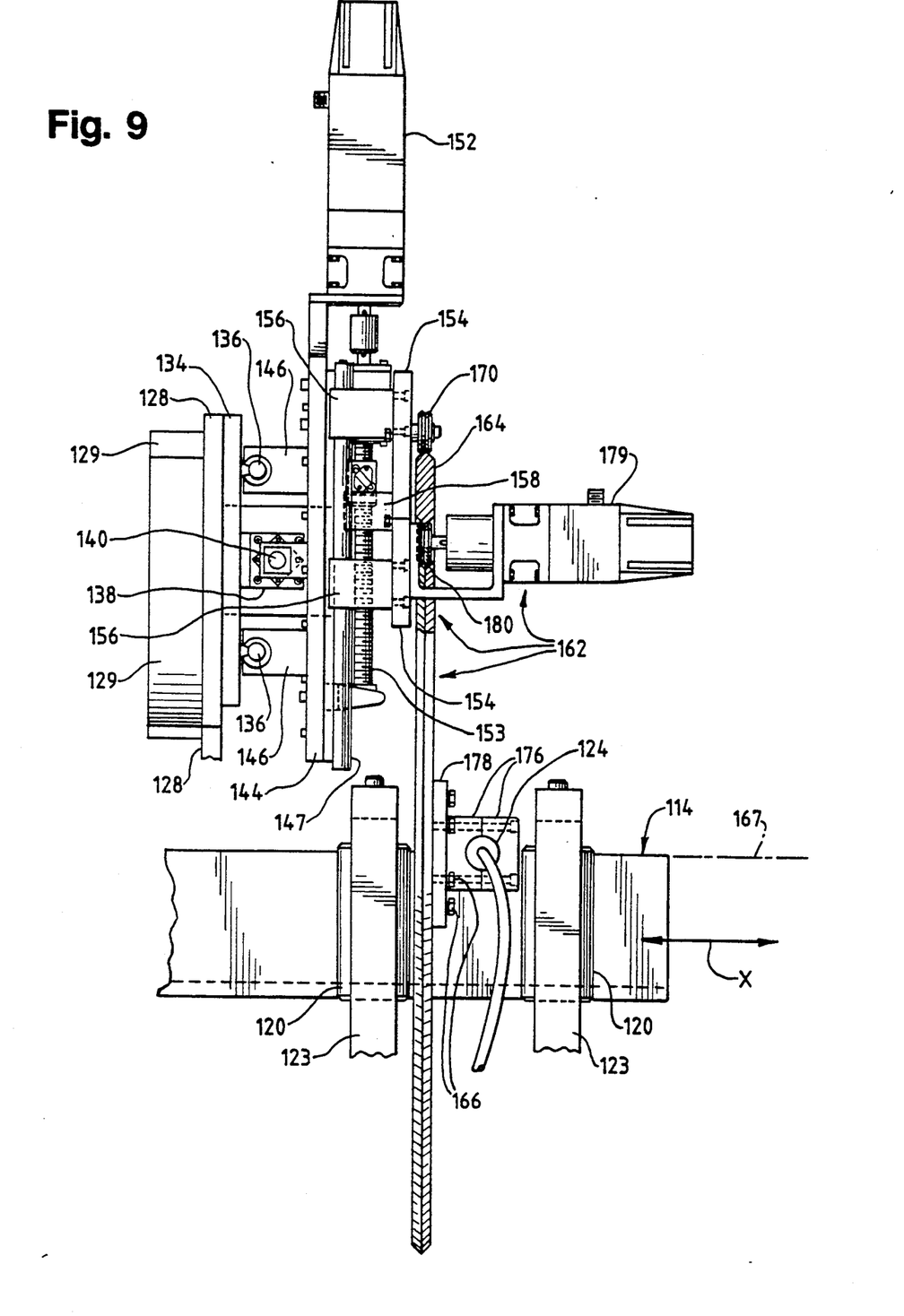
FIG. 9 is a fragmentary view taken generally along the plane 9—9 in FIG. 8.
Figure 10:
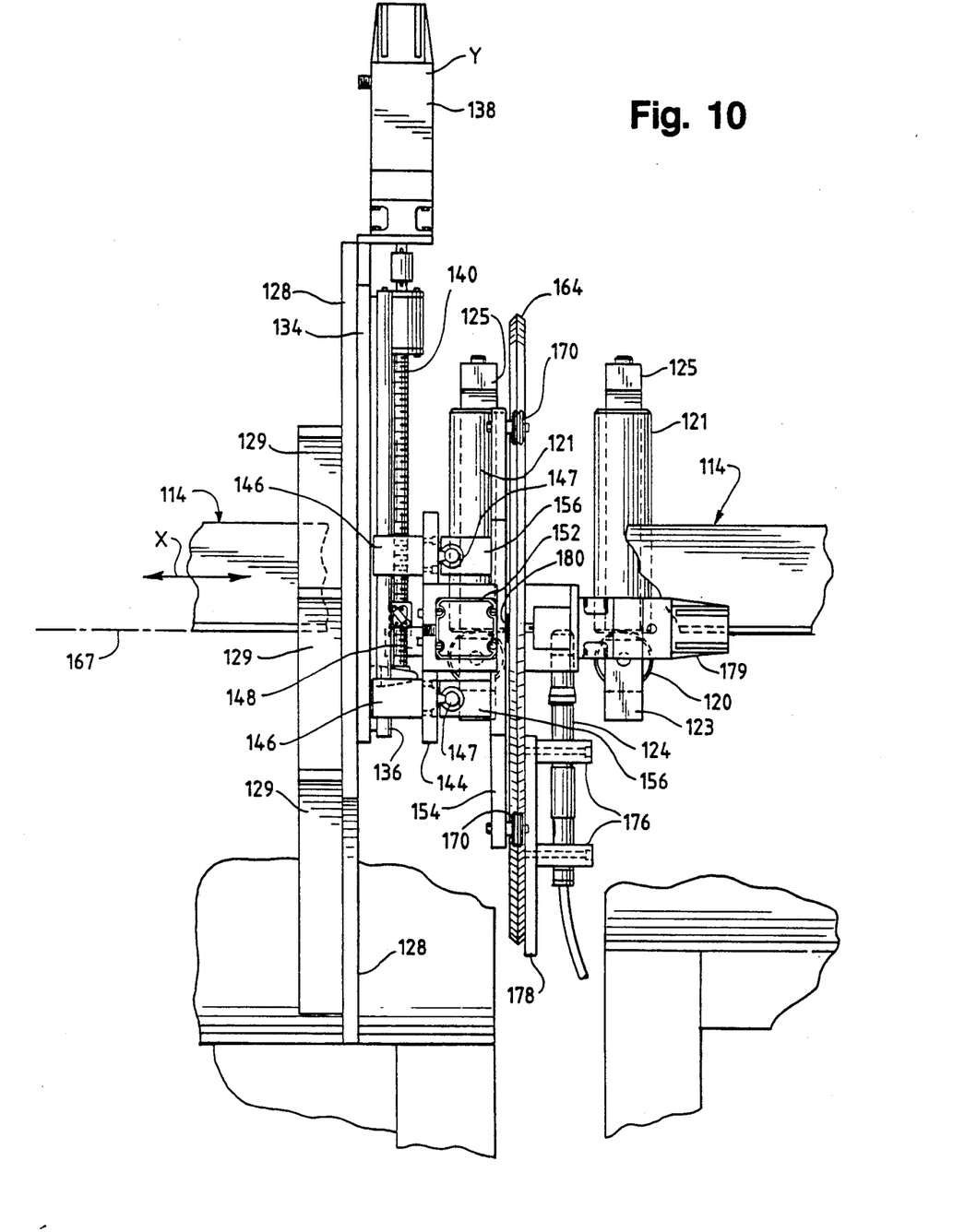
FIG. 10 is a fragmentary view taken generally along the plane 10—10 in FIG. 8.

As shown in FIG. 8, the rollers 120 and 121 are supported in conventional brackets 123 and 125, respectively, which are in turn mounted to a support frame 122. The frame 122 may be employed adjacent to, or for supporting, additional beam processing equipment, such as punch presses, shearing machines, cutting machines, drilling machines, and the like (not illustrated). Such additional machines would typically be provided on the left-hand side of the apparatus 110 as viewed in FIG. 7. Some such machines may be mounted between the spaced-apart pairs of conveyor rollers 120 and 121.

The rollers 120 and 121, along with the supporting components, may be characterized as forming part of a support system or conveying system and as defining a pass line along which the beam 114 can be moved. The support system or conveying system may further be viewed as defining a mutually orthogonal X, Y, and Z-axis coordinate system as illustrated in FIG. 8 wherein the X-axis is parallel to the pass line of the beam 114, wherein the Y-axis is parallel to the rollers 120 and to one of the beam flanges 118, and wherein the Z-axis is parallel to the rollers 120 and to the other beam flange 118.

It will be appreciated that the particular orientation of the beam and coordinate axes shown in FIG. 7-10 has been selected for providing a convenient method for conveying an angle beam 114 lengthwise down a beam processing line. Depending upon the particular conveying system employed, and perhaps upon the particular shape of the beam being conveyed, other orientations of a beam and of the associated orthogonal three-axis coordinate system may be employed. For example, either the Z-axis or Y-axis might be oriented generally vertically (parallel to the force of gravity).

The workpiece or angle beam 114 is preferably moved automatically along X-axis on the rollers 120 and 121 by the conveying system. In one form of the method of the present invention, movement of the beam 114 along the X-axis is effected to produce a cut in the beam at an oblique angle relative to the X-axis. The movement of the beam 114 along the X-axis may be effected with a suitable mechanism, such as drive rollers (not illustrated) or the illustrated beam gripping assembly 50 having jaws 72 and 74 for operating as described above with reference to the first embodiment shown in FIG. 1. In a particular embodiment of the method and apparatus of the present invention in which such X-axis movement is employed, the invention includes a suitable means for effecting such X-axis movement. However, the particular detailed design and structure of such a suitable beam moving means form no part of that embodiment of the invention.

The apparatus 110 includes a torch 124 which is disposed in a clearance region, defined in part by the frame 122, around at least a portion of the periphery of the transverse cross section of the beam 114 between two pairs of rollers. The torch 124 is supported by a mounting means which includes an arcuate positioning means 162, a Z-axis linear positioning means 142, and a Y-axis linear positioning means 132. The torch mounting means also includes a generally vertically oriented support plate 128 with rigidifying rib plates 129. The plates 128 and 129 are mounted to the frame 122, and the Y-axis linear positioning means 132 is mounted to the plate 128.

The Y-axis linear positioning means 132 is similar to, and functions generally in the same manner as, the Y-axis linear positioning means 32 described above with reference to the first embodiment illustrated in FIG. 1. The Y-axis linear positioning means 32 includes a base 134 mounted to the support frame 28. The base 134 has a pair of spaced-apart, parallel, guide rods 136. A drive means, such as an electrically-operated, servo-drive motor 138, is mounted to the base 134 and has an outwardly projecting, threaded, drive screw 140 between the two guide rods 136.

The Y-axis linear positioning means 32 supports and positions a Z-axis linear positioning means 142. The Z-axis linear positioning means 142 is similar to, and functions generally in the same manner as, the Z-axis linear positioning means 42 described above with reference to the first embodiment illustrated in FIG. 1.

The Z-axis linear positioning means 142 includes a base 144 having pairs of guide bearings or sleeves 146 mounted on the guide rods 136 of the Y-axis linear positioning means 132 to accommodate reciprocation of the Z-axis linear positioning means 142 along the Y-axis. The Z-axis linear positioning means 142 includes an internally threaded, driven sleeve 148 (FIG. 10) which is threadingly engaged with the drive screw 140 of the Y-axis linear positioning means servo-drive motor 138 to effect reciprocation of the Z-axis linear positioning means base 144 along the Y-axis.

The Z-axis linear positioning means 142 includes a pair of spaced-apart, parallel guide rods 147 mounted to the base 144. Also mounted to the base 144 is a Z-axis, electrically-operated, servo-drive motor 152 from which a drive screw 153 (FIG. 9) extends between, and parallel to, the guide rods 147.

A table 154 is mounted for movement along the Z-axis on the base 144. To this end, the table 154 includes pairs of spaced-apart guide bearings or guide sleeves 156 (FIGS. 9 and 10) which are slidably received on the guide rods 147 to accommodate reciprocation of the table 154 along the rods. An internally threaded drive sleeve 158 (FIG. 9) is mounted to the table 154 and is threadingly engaged with the threaded drive screw 153 of the servo-drive motor 152 of the Z-axis linear positioning means 142. The servo-drive motor 152 can be operated to effect movement of the table 154 in either direction along the Z-axis.

The Z-axis linear positioning means table 154 supports the arcuate positioning means 162 that moves the torch 124 in a circular arc. The arcuate positioning means 162 includes a plurality of spaced-apart rollers 170 (FIG. 8) mounted to, and projecting outwardly from, the table 154. The rollers 170 engage and support a circular guide ring 164. The inner and outer peripheral edges of the ring 164 have a V-shaped transverse cross section, and the rollers 170 have mating annular grooves. The guide ring 164 is thus maintained in a generally vertical plane defined by, or parallel to, the Y and Z-axes. The ring 164, unlike the ring 64 in the first embodiment, is free to revolve about its central axis 167 (FIG. 9) on the rollers 170.

The arcuate positioning means 162 further includes an electrically-operated, rotary servo-drive motor 179 which is mounted to the table 154 adjacent the inner edge of the guide ring 164. The motor 179 includes a drive roller 180 (FIG. 9) having a V-shaped annular groove for engaging the inner edge of the guide ring 164 and for effecting rotation of the guide ring 164 in either the clockwise or counterclockwise direction (as viewed in FIG. 8).

The torch 124 is mounted with brackets 176 to a plate 178 which is in turn fixed to the front surface of the guide ring 164 with screws 166 (FIG. 8). The torch 124 thus revolves with the ring 164 relative to the Z-axis linear positioner platform 154 when the rotary motor 179 is operated. Further, the torch 124 moves with the ring 164 and platform 154 along the Z-axis when the Z-axis linear positioning means 142 is operated. The torch 124 also moves along the Y-axis with the ring 164 and the Z-axis linear positioning means 142 when the Y-axis linear positioning means 132 is operated.

In the preferred form of the invention, the torch 124 is mounted on the radius of the guide ring 164 so that during operation the cutting tip of the torch flame is located at the ring central axis 167. The ring central axis 167 is parallel to the X-axis and, depending upon the workpiece and particular cutting operation involved, may be temporarily coincident with the X-axis during operation of the Y-axis and Z-axis linear positioning means.

The apparatus 110 may be conveniently operated to cut the angle beam 114 at an oblique angle to the X-axis. The apparatus can be initially positioned as illustrated in FIG. 8 with the torch 124 located to begin cutting at the top edge of the angle beam flange 118 lying against the short rollers 120. The Z-axis linear positioning means is then operated to move the guide ring 164 and torch 124 along the flange 118 from the top edge to the bottom. At the same time, the X-axis positioning means 50 is operated to move the beam along the X-axis (toward the right as viewed in FIG. 7). This causes the cut to be made at an oblique angle to the X-axis. The steepness of the angle depends upon the relative rates of motion along the Z and X-axes. If the rates of motion are not constant, then the cut will not be a straight line. This may be desirable in some applications.

When the torch 124 is at the bottom of the beam 114 (at the vertex of the angle defined by the two flanges 118), the motion of the beam 114 along the X-axis can be temporarily interrupted, and the torch 124 is swung through an arc of 90°. This is effected by operating the rotary motor 179 to revolve the ring 164 through a 90 arc. It will be appreciated that this pivots the torch 124 about the point where the flame impinges upon the bottom of the beam 114.

Next, the Y-axis linear positioning means 132 is operated to move the guide ring 164 and torch 124 along the Y-axis from the bottom of the beam 114 to the top edge of the other flange 118 lying against the long rollers 121. As this Y-axis motion is effected, the beam 114 is moved along the X-axis, in the direction opposite to the first X-axis motion (to the left as viewed in FIG. 7), so that the beam continues to be cut at the same oblique angle.

In an alternate form of the operation, the X-axis motion of the beam 114 need not be terminated as the torch 124 is swung 90° from the first orientation for cutting one flange to the second orientation for cutting the other flange. Depending upon the speed of revolution of the guide ring 164, and upon the tolerances, the beam 114 may be conveyed continuously along the X-axis while the torch 124 is reoriented.

The channel beam 14 described above with reference to the first embodiment illustrated in FIGS. 1-6 may also be processed in the second embodiment of the apparatus 110. At the appropriate points in the cutting process, the guide ring 164 would be rotated to pivot the torch 124 90° at the corner defined by the channel beam web and one of its flanges, and the ring 164 would again be rotated another 90° at the other corner of the channel beam.

Further, depending upon the rates of motion along the X, Y, and Z-axes, as well as upon the speed of ring revolution, shape and size of the beam, and tolerances, the X-axis motion of the beam may be continuous or may be interrupted at those points in the process wherein the guide ring 164 revolves.

It will be appreciated that, owing to the location of the rotary servo-drive motor 179 inside the ring 164, a complete 360° revolution of the ring 164 is not possible because the motor 179 would interfere with the torch 124 and mounting plate 178. However, if a complete 360° rotation of the ring 164 was desired in a particular application, then the apparatus could be modified to accommodate such operation. In particular, the rotary servo-drive motor 179 could be mounted on the outside of the ring 164. A larger diameter drive wheel could be provided on the motor shaft for engaging the ring 164 while providing clearance between the housing of the motor 179 and the ring 164. Further, the shape of the torch mounting plate 178 could be modified, and the plate 178 could be mounted in spaced relationship away from the front face of the guide ring 164 so as to ensure appropriate clearance for the tops of the ring support rollers 170.

The second embodiment of the apparatus 110, as well as the first embodiment of the apparatus 10, may also be operated to cut openings into the edges of the beam flanges or to cut oval apertures, slots, or other hole shapes in the beam webs and flanges. If desired, both the X and Z-axis linear positioning means may be operated simultaneously, with or without movement of the beam along the X-axis, in order to accommodate more complex shapes.

However, it is contemplated that the present invention is especially suitable for cutting structural beams in a relatively fast and efficient manner by moving the torch along the Z-axis without simultaneously moving the torch along the Y-axis, or vice versa, so as to avoid the need for more complicated controls. The present invention can thus be employed to avoid the use of more complex control systems as well as the use of robotic machines with articulating arms or other complex features.

Further, it will be appreciated that in the embodiments illustrated, the torch flame is oriented generally in the plane of the guide ring 64 or 164 (i.e., the plane defined by the Y and Z-axes perpendicular to the X-axis). It will be appreciated, however, that the torch flame could also be oriented at an oblique angle relative to the X-axis for producing a beveled cut. For example, with reference to the embodiment illustrated in FIG. 10 for the torch 124, the torch clamps 176 could be modified so that the front end of the torch 124 points at an angle toward or away from the guide ring 164. The operation of the apparatus would otherwise be identical to the operation described above with all of the attendant advantages.

It will be readily apparent from the foregoing detailed description of the invention and from the illustrations thereof that numerous variations and modifications may be effected without departing from the true spirit and scope of the novel concepts or principles of this invention.

What is claimed is:

1. A method for cutting an elongate workpiece along a cutting path in at least two planes seriatim with a flame from a single cutting torch, said method comprising the steps of:
   (A) in a mutually orthogonal X, Y, and Z-axis coordinate system, supporting said workpiece oriented lengthwise along said X-axis;
   (B) mounting said torch adjacent said workpiece and positioning said torch with said flame in a first orientation to impinge upon said workpiece at a first location on said cutting path;
   (C) while maintaining the impingement of said flame on said workpiece, moving said workpiece along said X-axis during at least one of the following steps (D) and (F);
   (D) moving said torch with said flame in said first orientation so as to include a component of flame motion along at least one of said Y and Z axes and to move said flame to a second location along said cutting path for cutting said workpiece between said first and second locations;
   (E) while maintaining the impingement of said flame on said workpiece, swinging said torch in a circular arc to move said flame to a second orientation by pivoting said flame about the arc central axis which passes through said second location and which is parallel to said X-axis; and
   (F) while maintaining the impingement of said flame on said workpiece, moving said torch with said flame in said second orientation so as to include a component of flame motion along at least one of said Y and Z axes and to move said flame to a third location along said cutting path for cutting said workpiece between said second and third locations.

2. The method in accordance with claim 1 in which step (C) includes moving said workpiece in a first direction along said X-axis during step (D), terminating the X-axis movement prior to step (E), and moving said workpiece in a second direction opposite to said first direction along said X-axis in step (F).

3. The method in accordance with claim 1 in which step (C) includes moving said workpiece along said X-axis during step (D) and interrupting the X-axis movement during steps (E) and (F).

4. The method in accordance with claim 1 in which
   step (B) includes mounting said torch to orient said flame in a plane generally normal to said X-axis; and
   step (E) includes swinging said torch on a circular arc guide in said plane generally normal to said X-axis.

5. A method for cutting an elongate workpiece along a cutting path in at least two planes seriatim with a flame from a single cutting torch, said method comprising the steps of:
   (A) in a mutually orthogonal X, Y, and Z-axis coordinate system, supporting said workpiece oriented lengthwise along said X-axis to provide a clearance region around at least a major portion of the periphery of the transverse cross section of said workpiece;
   (B) mounting said torch in said clearance region to position said flame in a cutting plane generally normal to said X-axis and to position said torch with said flame in a first orientation to impinge upon said workpiece at a first location on said cutting path;
   (C) while maintaining the impingement of said flame on said workpiece, moving said torch with said flame in said first orientation so as to include a component of motion along at least one of said Y and Z axes and to move said flame to a second location along said cutting path for cutting said workpiece between said first and second locations;
   (D) while maintaining the impingement of said flame on said workpiece, swinging said torch on a circular arc guide to pivot said flame in said cutting plane about said second location to a second orientation; and
   (E) while maintaining the impingement of said flame on said workpiece, moving said torch with said flame in said second orientation so as to include a component of motion along at least one of said Y and Z axes and to move said flame to a third location along said cutting path for cutting said workpiece between said second and third locations.

6. The method in accordance with claim 5 further including the step of conveying said workpiece in one direction along said X-axis during at least one of said steps (C) and (E).

7. A method for cutting an elongate workpiece along a cutting path in at least two planes seriatim with a flame from a single cutting torch, said method comprising the steps of:

(A) in a mutually orthogonal X, Y, and Z-axis coordinate system, supporting said workpiece oriented lengthwise along said X-axis;

(B) mounting said torch adjacent said workpiece and positioning said torch with said flame in a first orientation to impinge upon said workpiece at a first location on said cutting path;

(C while maintaining the impingement of said flame on said workpiece, moving said torch with said flame in said first orientation so as to include a component of motion along at least one of said Y and Z axes and to move said flame to a second location along said cutting path for cutting said workpiece between said first and second locations;

(D) while maintaining the impingement of said flame on said workpiece, swinging said torch on a circular arc guide to move said flame to a second orientation by pivoting said flame about the arc central axis which passes through said second location and which is parallel to said X-axis; and (E) while maintaining the impingement of said flame on said workpiece, moving said torch with said flame in said second orientation so as to include a component of motion along at least one of said Y and Z axes and to move said flame to a third location along said cutting path for cutting said workpiece between said second and third locations.

8. The method in accordance with claim 7 further including the step of conveying said workpiece in one direction along said X-axis during at least on of said steps (C) and (E).

9. An apparatus for cutting an elongate workpiece along a cutting path in at least two planes seriatim with a flame from a single cutting torch, said apparatus comprising:

(A) support means for supporting said workpiece oriented lengthwise along an X-axis in a mutually orthogonal X, Y, and Z-axis coordinate system; and (B) torch mounting means for mounting said torch with said flame in an orientation to impinge upon said workpiece on said cutting path, said torch mounting means including:
  (a) arcuate positioning means for supporting and moving said torch in a circular arc locus relative to a central axis parallel to said X-axis,
  (b) Z-axis linear positioning means for supporting and moving said arcuate positioning means along said Z-axis, and
  (c) Y-axis linear positioning means fixed relative to said support means for supporting and moving said Z-axis linear positioning means along said Y-axis.

10. The apparatus in accordance with claim 9 in which
said support means for said workpiece includes a series of pairs of rollers spaced-apart along said X-axis; and
said rollers of each said pair of rollers are mounted for rotation about two mutually orthogonal axes and oriented to define a generally upwardly open, V-shaped cradle for said workpiece.

11. The apparatus in accordance with claim 9 in which said Z-axis linear positioning means includes a base, a table, means for mounting said table to said base to accommodate movement of said table relative to said base, drive means mounted to said base and operatively engaged with said table for moving said table relative to said base, and means for mounting said arcuate positioning means to said table.

12. The apparatus in accordance with claim 11 in which said arcuate positioning means includes a circular guide ring.

13. The apparatus in accordance with claim 12 in which
said means for mounting said arcuate positioning means to said table includes rollers mounted on said table with each said roller being mounted for rotation about an axis parallel to said X-axis;
said guide ring is disposed on said rollers in a plane normal to said X-axis and central axis for rotating about said central axis;
said torch is mounted on said guide ring for movement therewith; and
said arcuate positioning means includes a rotary drive means carried on said table for engaging and rotating said guide ring.

14. The apparatus in accordance with claim 12 in which
said means for mounting said arcuate positioning means to said table includes a fixed mechanical connection between said table and guide ring to orient said ring in a plane normal to said X-axis and central axis;
said arcuate positioning means includes
  a movable carriage and means mounting said torch to said carriage,
  rollers on said carriage for engaging said ring with each said roller being mounted to said carriage for rotation about an axis parallel to said X-axis and central axis, and
  a rotary drive means mounted on said carriage for engaging said guide ring and moving said carriage on said guide ring about said central axis.

15. An apparatus for cutting an elongate workpiece along a cutting path in at least two planes seriatim with a flame from a single cutting torch, said apparatus comprising:

(A) support means for supporting said workpiece oriented lengthwise along an X-axis in a mutually orthogonal X, Y, and Z-axis coordinate system;

(B) X-axis positioning means for moving said workpiece along said X-axis on said support means; and (C) torch mounting means for mounting said torch with said flame in an orientation to impinge upon said workpiece on said cutting path in a cutting plane perpendicular to said X-axis, said torch mounting means including:
  (a) arcuate positioning means for supporting and moving said torch in a circular arc locus relative a central axis parallel to said X-axis to pivot said flame in said cutting plane about said central axis,
  (b) Z-axis linear positioning means for supporting and moving said arcuate positioning means along said Z-axis, and
  (c) Y-axis linear positioning means fixed relative to said support means for supporting and moving said Z-axis linear positioning means along said Y-axis.

16. The apparatus in accordance with claim 15 in which said Z-axis linear positioning means includes a base, a table, means for mounting said table to said base to accommodate movement of said table relative to said base, drive means mounted to said base and operatively engaged with said table for moving said table relative to said base, and means for mounting said arcuate positioning means to said table.

17. The apparatus in accordance with claim 16 in which said arcuate positioning means includes a circular guide ring.

18. The apparatus in accordance with claim 17 in which
- said means for mounting said arcuate positioning means to said table includes rollers mounted on said table with each said roller being mounted for rotation about an axis parallel to said X-axis;
- said guide ring is disposed on said rollers in a plane normal to said X-axis and central axis for rotating about said central axis;
- said torch is mounted on said guide ring for movement therewith; and
- said arcuate positioning means includes a rotary drive means carried on said table for engaging and rotating said guide ring.

19. The apparatus in accordance with claim 17 in which
- said means for mounting said arcuate positioning means to said table includes a fixed mechanical connection between said table and guide ring to orient said ring in a plane normal to said X-axis and central axis;
- said arcuate positioning means includes
  - a movable carriage and means mounting said torch to said carriage,
  - rollers on said carriage for engaging said ring with each said roller being mounted to said carriage for rotation about an axis parallel to said X-axis and central axis, and
  - a rotary drive means mounted on said carriage for engaging said guide ring and moving said carriage on said guide ring about said central axis.

* * * * *